US006716353B1

(12) United States Patent
Mirzadeh et al.

(10) Patent No.: US 6,716,353 B1
(45) Date of Patent: Apr. 6, 2004

(54) METHOD FOR PREPARING HIGH SPECIFIC ACTIVITY $^{177}$LU

(75) Inventors: Saed Mirzadeh, Knoxville, TN (US); Miting Du, Knoxville, TN (US); Arnold L. Beets, Clinton, TN (US); Furn F. Knapp, Jr., Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/283,608

(22) Filed: Oct. 30, 2002

(51) Int. Cl.$^7$ ................................. B01D 15/08
(52) U.S. Cl. ................... 210/635; 210/656; 210/198.2; 423/3; 423/6; 423/249
(58) Field of Search ................. 210/635, 656, 210/198.2; 423/3, 6, 249

(56) References Cited

U.S. PATENT DOCUMENTS 5,809,394 A * 9/1998 Bray et al. .................. 423/3

OTHER PUBLICATIONS

Resin Information, Eichrom Industries Apr. 1998, pp. 1–4 from the internet site URL at www.eichrom.com/analytical/radio/newsletters/resin/a98–Inres.hmt.*

Shuang Liu et al, "90–Y and 177–Lu Labeling of a DOTA––Conjugated Vitronectin Receptor Antagonist Useful for Tumor Therapy," Bioconjugate Chem. 2001, p. 559–568.

Nikolai A. Lebedev, et al, "Radiochemical Separation of No–Carrier–Added 177–Lu as Produced via the 176–Yb(n, γ) 176–Yb→177–Lu Process," App. Radiation & Isotopes (2000), p. 421–425.

* cited by examiner

Primary Examiner—Ernest G. Therkorn
(74) Attorney, Agent, or Firm—Joseph A. Marasco

(57) ABSTRACT

A method of separating lutetium from a solution containing Lu and Yb, particularly reactor-produced $^{177}$Lu and $^{177}$Yb, includes the steps of: providing a chromatographic separation apparatus containing LN resin; loading the apparatus with a solution containing Lu and Yb; and eluting the apparatus to chromatographically separate the Lu and the Yb in order to produce high-specific-activity $^{177}$Yb.

6 Claims, 4 Drawing Sheets

METHOD FOR PREPARING HIGH SPECIFIC ACTIVITY $^{177}$LU

The United States Government has rights in this invention pursuant to contract no. DE-AC05-00OR22725 between the United States Department of Energy and UT-Battelle, LLC.

The present invention relates to methods of preparing medically useful radioisotopes, particularly high specific activity no-carrier-added radioisotopes, and more particularly to methods of preparing high specific activity, no-carrier-added Lutetium-177 ($^{177}$Lu).

The use of beta particle-emitting radioisotopes for applications in nuclear medicine, oncology and interventional cardiology is rapidly increasing, because of the availability of new pharmaceutical targeting approaches, which effectively concentrate or localize the radioactive vector at the target site with low uptake in non-target tissues. In this manner the energy released from radioactive decay can be localized for killing cells at the target site, such as a tumor. In this regard the use of such radiopharmaceuticals has been shown to be effective in treating a variety of tumors.

Some peptides radiolabeled with $^{177}$Lu (T ½=6.7 days), a low-energy beta emitter ($E_{max}$ 0.497 MeV), are considered particularly useful as a result of rapid cellular uptake whereby radioactive decay occurs within the cell. Low-energy beta emissions are highly effective in the immediate vicinity of the cell, and the effect on adjacent, normal and sensitive tissues is minimal. Therefore, it is desirable to obtain $^{177}$Lu in high purity, high specific activity form.

$^{177}$Lu can be produced in a nuclear reactor by the conventional "direct" production method involving neutron capture of enriched $^{176}$Lu, as shown in FIG. 1. Since the nonradioactive target atoms and radioactive product atoms cannot be separated by chemical means, the radioactive $^{177}$Lu is diluted with significant amounts of the $^{176}$Lu carrier. Moreover, metastable $^{177m}$Lu is also produced by the "direct" method. Metastable $^{177m}$Lu, having a half-life of 160 days, is generally considered harmful for nuclear medicine applications because of the potential for extended patient exposure to radiation.

The amount of $^{176}$Lu target (carrier) determines the specific activity (Curies/gram), with higher specific activity products being produced in higher neutron flux reactors such as the Oak Ridge National Laboratory (ORNL) High Flux Isotope Reactor (HFIR). Although high specific activity (>80 Curies/mg) can be produced by this method in a high flux reactor such as the ORNL HFIR, it is desirable to obtain higher specific activity $^{177}$Lu in order to attain a higher specific dosage and also to extend the shelf life of $^{177}$Lu inventory. It is also desirable to have a method available to provide high specific activity $^{177}$Lu that is essentially free of long-lived $^{177m}$Lu impurity.

There has been interest for several years in the "indirect" method of reactor production of $^{177}$Lu, which is obtained from decay of the short-lived (T ½=2 hours) $^{177}$Yb radioisotope, which is produced in a reactor by irradiation of enriched $^{176}$Yb targets (also shown in FIG. 1). The indirect method is advantageous over the direct method in that there is little or no metastable $^{177m}$Lu produced by the indirect method. However, there remain large amounts of Yb target material that should be removed.

A major hindrance in the feasibility of producing no-carrier-added $^{177}$Lu is lack of an effective method of the separating no-carrier-added $^{177}$Lu from high levels of Yb. Separation of adjacent lanthanides is notoriously difficult using conventional ion exchange chromatography and other known methods because of the close similarity in the chemical properties of lanthanides.

An effective and efficient method of separating $^{177}$Lu from reactor-produced $^{177}$Yb is needed to provide high specific activity, no carrier-added $^{177}$Lu. The only successful preparative scale separation of Lu and Yb which has been reported in the literature is the recent paper by Lebedev, et al., which describes the use of a difficult and cumbersome cementation process, in which tracer levels of $^{177}$Lu are separated from macroscopic levels of Yb by the repetitive, selective extractions of Yb using a sodium (mercury) amalgam from chloride/acetate electrolytes, followed by a final cation exchange purification step. Such a method is not generally considered feasible for preparing $^{177}$Lu in sufficient amounts for practical applications in nuclear medicine because of potential contamination with toxic mercury.

Accordingly, objectives of the present invention include provision of: methods of separating microscopic amounts of Lu from macroscopic amounts of Yb; methods of preparing $^{177}$Lu that is at least one of high specific activity, no-carrier-added, and essentially free of $^{177m}$Lu; and methods of treating disease using no-carrier-added $^{177}$Lu. Further and other objectives of the present invention will become apparent from the description contained herein.

In accordance with one aspect of the present invention, the foregoing and other objects are achieved by a method of separating lutetium from a solution containing Lu and Yb includes the steps of: providing a chromatographic separation apparatus containing LN resin; loading the apparatus with a solution containing Lu and Yb; and eluting the apparatus to chromatographically separate the Lu and the Yb.

In accordance with another aspect of the present invention, a composition of matter comprising essentially $^{177}$Lu which is characterized by at least one of: essentially $^{177m}$Lu-free (no or insignificant presence thereof), no-carrier-added, and a specific activity of at least 100 Ci/mg Lu.

For a better understanding of the present invention, together with other and further objects, advantages and capabilities thereof, reference is made to the following disclosure and appended claims in connection with the above-described drawings.

It was discovered that tracer levels of $^{177}$Lu can be separated from macroscopic amounts of Yb using commercial-grade LN resin available from Eichrom Technologies, Inc., 8205 S. Cass Ave., Suite 106, Darien, Ill. 60561. LN resin comprises di(2-ethylhexyl)orthophosphoric acid (HDEHP).

$^{177}$Yb was not readily available for initial testing of the invention. Therefore, initially, separation efficiency of $^{177}$Lu from Yb was monitored by a radiochemical technique using a mock solution of $^{169}$Yb radioisotope (half-life 32 days) as a substitute. The method of the present invention can be used to separate Lu and Yb, regardless of the particular isotopes involved.

EXAMPLE I

A mock solution was prepared by mixing 10 mg of natural Yb with a few hundred microcuries each of $^{177}$Lu and $^{169}$Yb radioisotopes. The 10 mg of Yb was used to simulate the mass of a $^{176}$Yb target that would be irradiated in the HFIR to produce $^{177}$Yb. Several loading concentrations, acid concentrations, flow-rates and column dimensions were evaluated. The low nanogram levels of Lu were not efficiently separated from the macroscopic mg levels of Yb, using HNO$_3$ elution of the LN resin, as recommended by the manufacturer. Neither Yb nor Lu was eluted from the LN resin using HNO$_3$, as recommended by the manufacturer. Nitric acid concentrations up to 2 N were evaluated for elution of the LN resin.

EXAMPLE II

Figure 1:
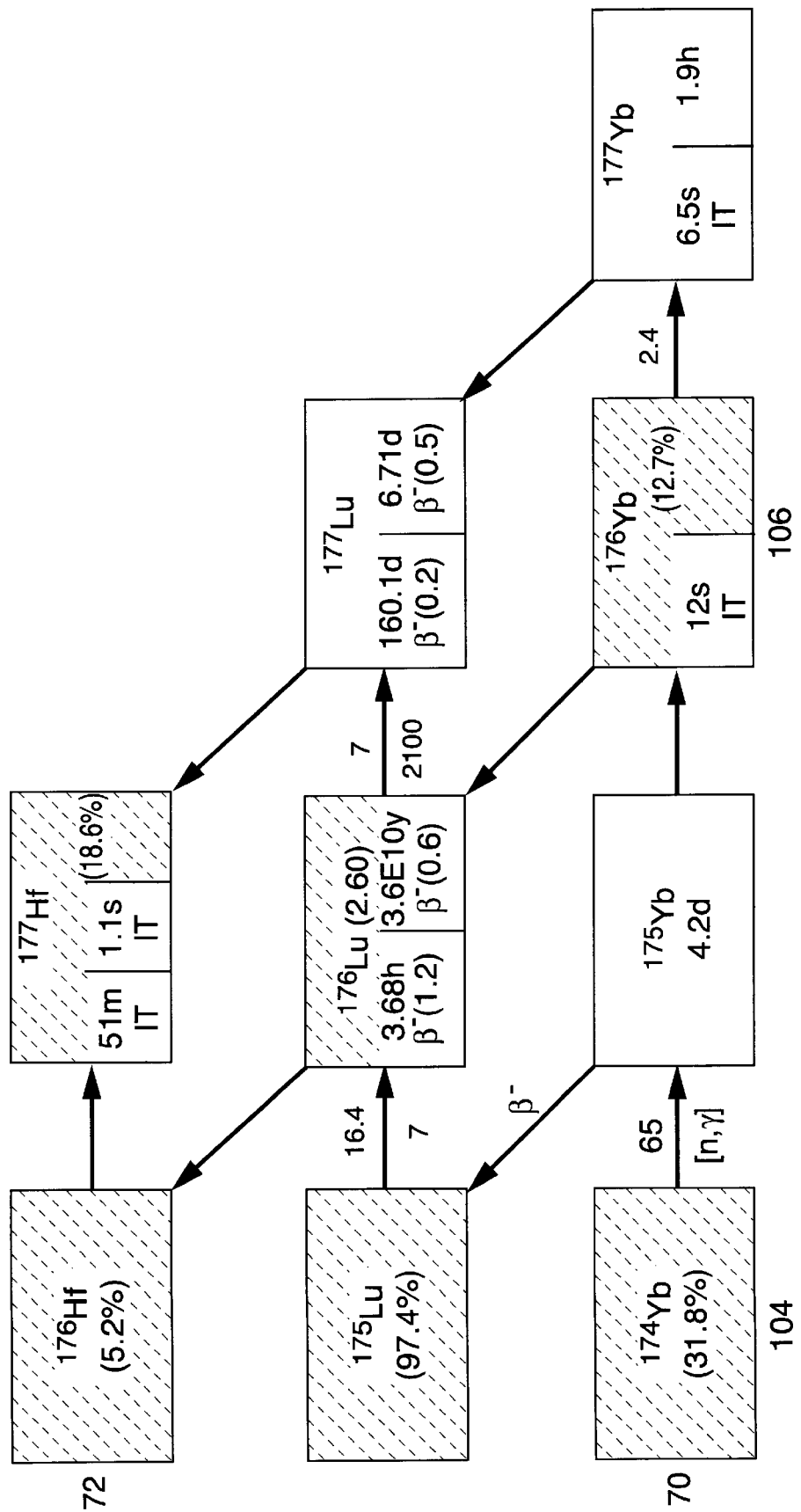
FIG. 1 is a flow chart showing direct and indirect reactor routes for production of $^{177}$Lu radioisotope.
Figure 2:
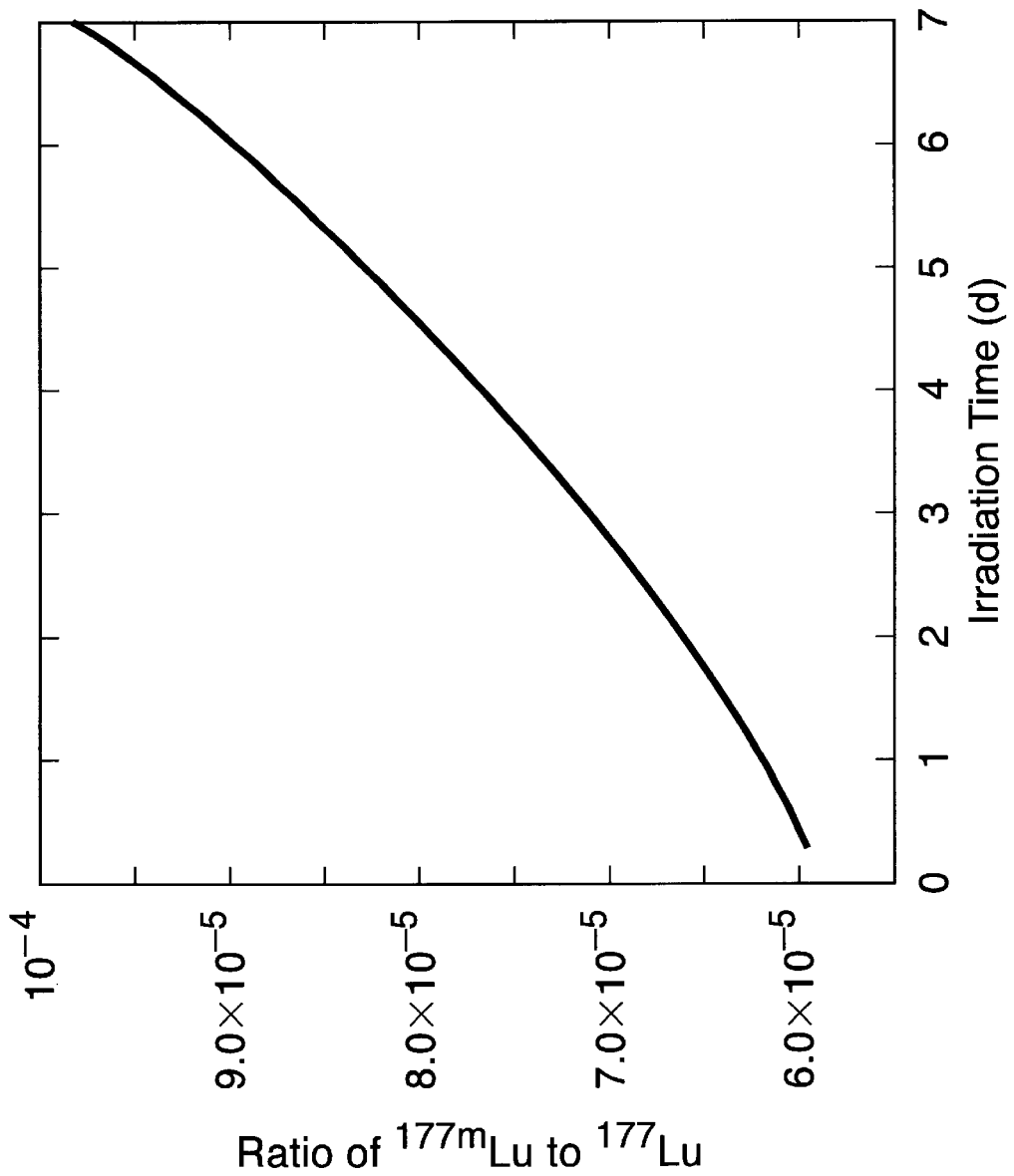
FIG. 2 is a graph showing the calculated $^{177m}$Lu/$^{177}$Lu ratio at the end of irradiation (EOI) of $^{176}$Lu in the ORNL HFIR.
Figure 3:
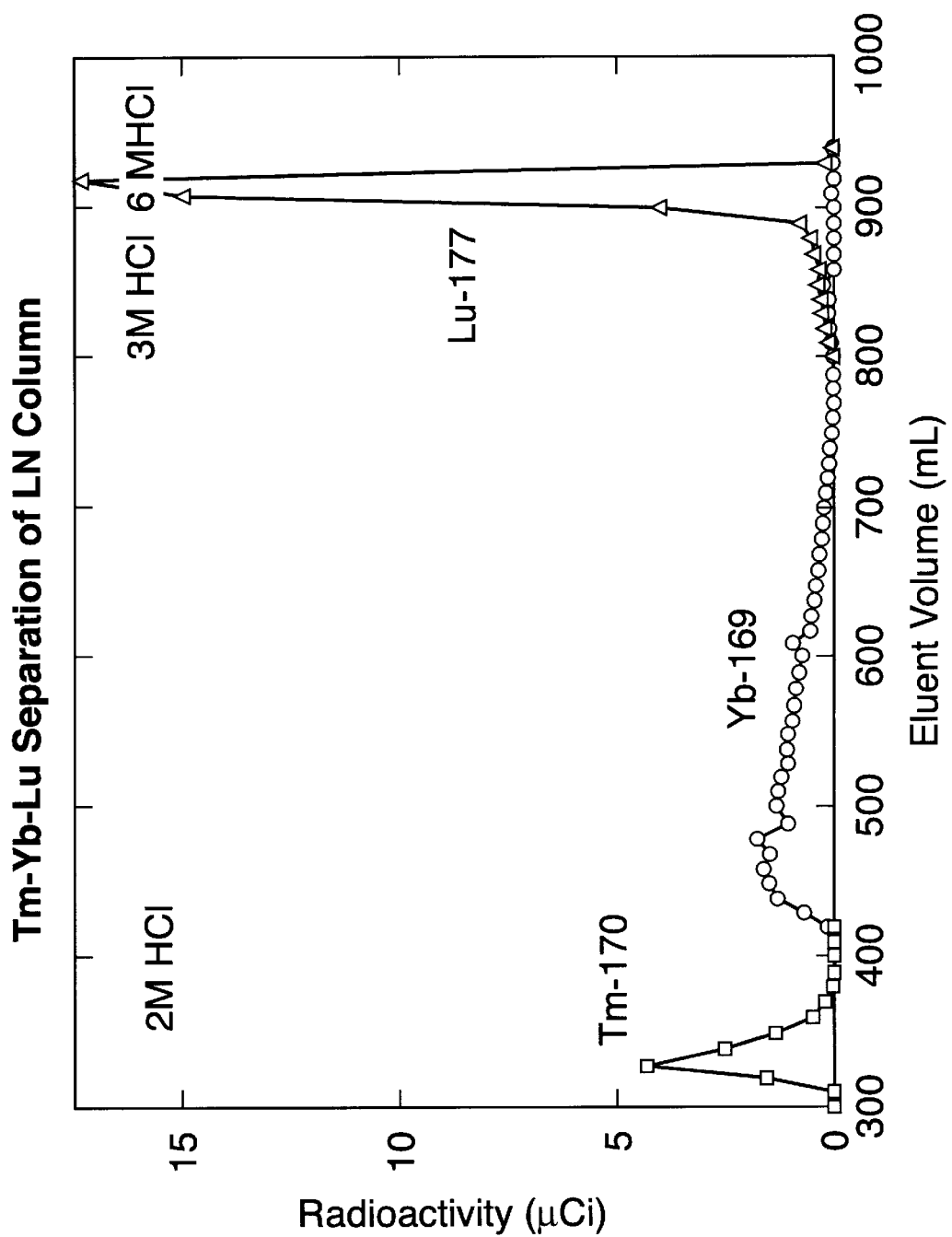
FIG. 3 is a graph showing the separation of $^{177}$Lu from ytterbium using elution of LN Resin with HCl as described in Example II in accordance with the present invention.

Separation of Lu from Yb was tested as described above in Example I, but with the substitution of HCl for HNO$_3$. It was found that the use of HCl provided a more efficient separation. A typical example of this unexpected and excellent separation is shown in FIG. 3.

Subsequently, $^{177}$Yb was made available for testing of the invention, and tests were made with actual materials, as described hereinbelow.

EXAMPLE III

Figure 4:
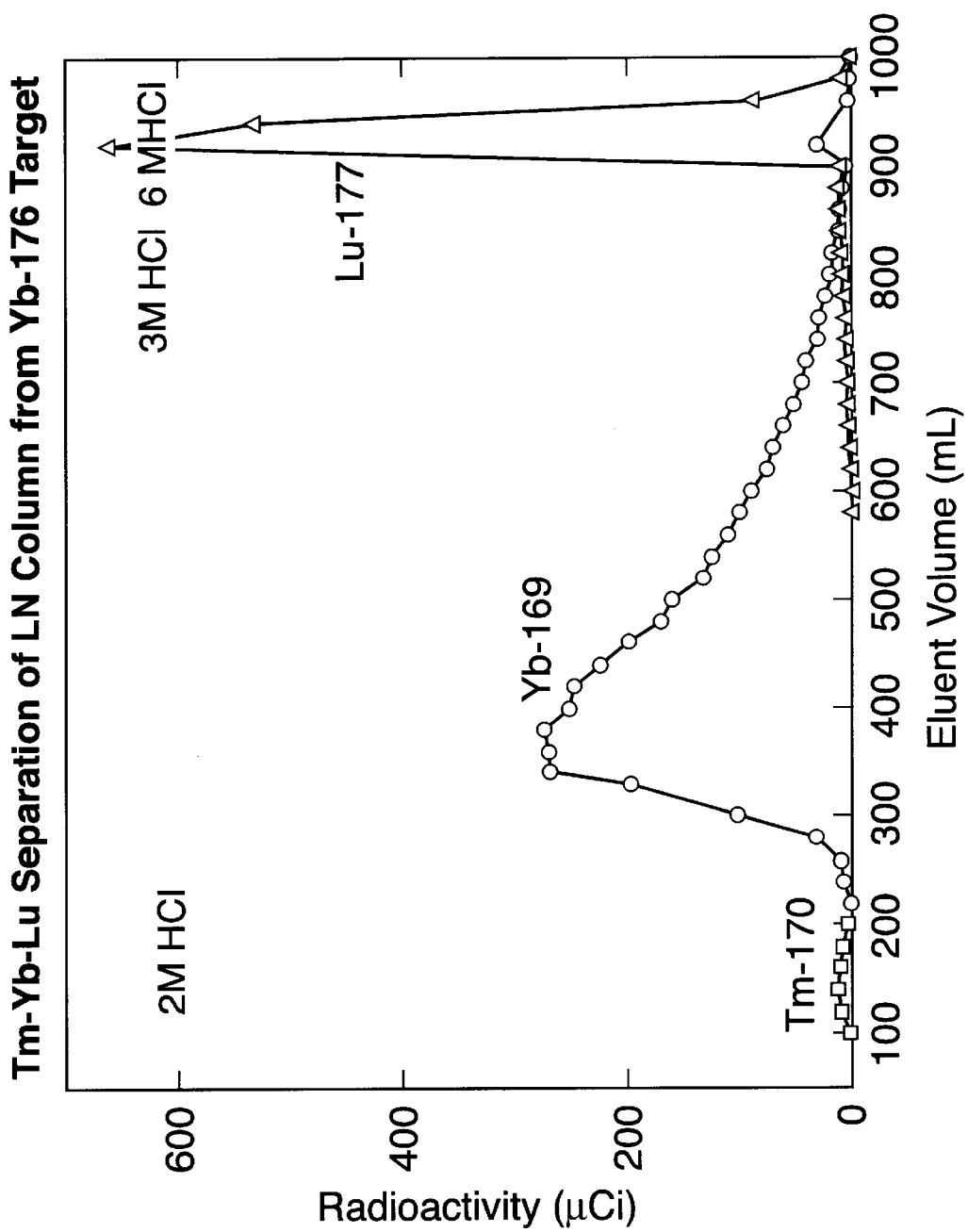
FIG. 4 is a graph showing the separation of $^{177}$Lu from ytterbium using elution of LN Resin with HCl as described in Example III in accordance with the present invention.

A method was carried out as described in Example II, with HCl as the eluent. The column was eluted with increasing concentrations of HCl solution at a flow rate of 0.67 mL/min. The results of a typical successful lutetium/ytterbium separation are shown in FIG. 4 and consisted of initial elution with 2 M HCl (Fractions 1–87) followed by increasing the acid concentration to 3 M (Fractions 88–89) and then 6 M HCl (Fractions 90–100). The first peak in the chromatogram shown in FIG. 4 was $^{170}$Tm, which is formed by neutron activation of stable $^{169}$Tm impurity in the enriched $^{176}$Yb target material. The ytterbium peak was then eluted in the 400–700 mL column volume and finally the $^{177}$Lu was eluted with 6 M HCl. The radioactive components in each fraction was identified and quantified by their corresponding gamma rays in a calibrated solid-state gamma-ray spectrometer. Calculations indicated that the eluted $^{177}$Lu had a theoretical specific activity of 109 Ci/mg Lu, and, in practice, specific activities of at least 100 Ci/mg Lu can be expected.

If residual ytterbium is detected in the pooled $^{177}$Lu fractions from the first column, these fractions can be evaporated, and re-dissolved in, for example, 0.1 M HCl and purified by repeating the separation process.

The skilled artisan will understand that specific activity of $^{177}$Lu obtained using the method of the present invention is dependent upon quality of stalling materials, neutron flux, and irradiation time. It is contemplated that the specific activity will in most cases be at least 100 Ci/mg Lu. Moreover, the level of $^{177}$Lu is significantly reduced or eliminated.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of separating lutetium from a solution containing Lu and Yb comprising the steps of:
   a. providing a chromatographic separation apparatus containing HDEHP;
   b. loading said apparatus with a solution containing Lu and Yb; and
   c. eluting said apparatus to chromatographically separate said Lu and said Yb.

2. A method in accordance with claim 1 wherein said eluting step is carried out using an eluent solution comprising HCl.

3. A method in accordance with claim 1 wherein said Lu comprises $^{177}$Lu.

4. A method in accordance with claim 3 wherein said $^{177}$Lu is essentially free of $^{177m}$Lu.

5. A method in accordance with claim 3 wherein said $^{177}$Lu is essentially no-carrier-added.

6. A method in accordance with claim 3 wherein said $^{177}$Lu is characterized by a specific activity of at least 100 Ci/mg Lu.

* * * * *